United States Patent [19]

Pye et al.

[11] 4,192,753

[45] Mar. 11, 1980

[54] WELL COMPLETION AND WORKOVER FLUID HAVING LOW FLUID LOSS

[75] Inventors: David S. Pye, Brea; Julius P. Gallus, Anaheim; Paul W. Fischer, Whittier, all of Calif.

[73] Assignee: Union Oil Company of California, Brea, Calif.

[21] Appl. No.: 884,128

[22] Filed: Mar. 7, 1978

[51] Int. Cl.² .................. C09K 7/02; E21B 43/25
[52] U.S. Cl. ................... 252/8.5 A; 166/283; 252/8.5 C; 252/8.55 R
[58] Field of Search ........... 252/8.5 A, 8.5 C, 8.5 LC, 252/8.55 R; 166/283

[56] References Cited

U.S. PATENT DOCUMENTS

| | | | |
|---|---|---|---|
| 3,302,719 | 2/1967 | Fischer | 252/8.55 R X |
| 3,870,668 | 3/1975 | Fischer et al. | 260/28.5 R |
| 3,882,029 | 5/1975 | Fischer et al. | 252/8.55 R |
| 3,898,167 | 8/1975 | Crowe | 252/8.55 C |
| 3,954,629 | 5/1976 | Scheffel et al. | 252/8.5 LC |
| 3,979,304 | 9/1976 | Fischer et al. | 252/8.55 R |

*Primary Examiner*—Herbert B. Guynn
*Attorney, Agent, or Firm*—Dean Sandford; Gerald L. Floyd

[57] ABSTRACT

A non-damaging variable-density low fluid loss well completion and workover fluid composition which is a dispersion of finely divided slowly oil-soluble, water-insoluble solid particulate matter in a thickened aqueous salt solution. The fluid composition is a mixture of an aqueous solution of a water-soluble inorganic salt, a first high softening point resin fluid loss control additive, a microemulsion fluid loss control additive, and, optionally, a water-dispersible thickening agent and/or a pH control agent. The microemulsion contains water, an oil-soluble surface active agent, a water-dispersible surface active agent, and, as a fluid loss control additive, a mixture of a wax and a second low softening point resin. The microemulsion also optionally contains an additive to prevent phase separation and/or a bactericide. Also disclosed is a method for using this composition in various well drilling, completion and treating operations.

28 Claims, No Drawings

WELL COMPLETION AND WORKOVER FLUID HAVING LOW FLUID LOSS

BACKGROUND OF THE INVENTION (1) Field of the Invention

This invention relates to the drilling of wells into subterranean reservoirs, and more particularly to a composition and method for use thereof in drilling such wells wherein penetration of the reservoir by the composition is minimized, thus minimizing the reduction in the permeability of the reservoir which can result from an invasion of the reservoir by the composition. The invention especially relates to such a composition and method employing a composition which has low fluid loss properties during its use and ultimately substantially dissolves or disperses in the formation fluid with which it comes in contact.

(2) Description of the Prior Art

In various well drilling, completion, treating and workover operations in permeable hydrocarbon-producing reservoirs, it is often advantageous to inject a fluid into the well in such a manner that the fluid is in contact with the reservoir penetrated by the well. The injected fluid may be used, for example, as a drilling fluid, a hydraulic fracturing fluid, an acidizing fluid, a fluid for the placement of a gravel pack in the well and the like. The injected fluid has a tendency to penetrate the reservoir. Since most reservoirs are heterogeneous in permeability at least to some degree, the injected fluid tends to preferentially flow into the zones of higher permeability, called thief zones. Not only does this flow result in a loss and waste of the fluid, but also prevents the injected fluid from entering into zones of lower permeability in substantial quantities, thus causing poor fluid distribution between zones of different permeability. Accordingly, fluid loss control agents, and in particular plugging agents, have been developed for use in such fluids. These fluid loss control agents tend to plate out on the face of the reservoir into which the fluid is being injected and restrict further fluid flow through that portion of the reservoir. In the various well operations, it is necessary that the fluid loss control or plugging agent be eventually readily removed from the hydrocarbon-producing zones to prevent a permanent and an attendant reduction in oil production rate. Removal of the plugging material may be effectively accomplished by utilizing an agent that is soluble in the reservoir fluids, either water or hydrocarbons, and producing the well. However, many of the prior art materials are either insoluble under bottom hole conditions, or are so highly soluble that they are difficult to place in the reservoir before they dissolve and fail to provide and maintain the required plugging action throughout the treating operation. It is therefore essential that the fluid loss or plugging agent composition possess the property of controlled solubility wherein a satisfactory solid plug will be formed for a period of time necessary to carry out the well operation, which plug will thereafter be removed by being slowly dissolved in the reservoir fluids.

It is also advantageous to utilize an additive that is largely soluble in hydrocarbons and insoluble in water, thereby leaving any water-producing strata permanently sealed. Thus, selective plugging is effected, the hydrocarbon-producing strata are temporarily plugged and the water-producing strata remain permanently sealed. On removal of the temporary plugging agent from the hydrocarbon-producing strata, oil and gas production capability is fully restored, while water production is permantly eliminated or substantially decreased.

Various slowly oil-soluble, water-insoluble particulate agents useful in well drilling and treating operations have been developed. U.S. Pat. No. 3,302,719 discloses such solid particles comprised of a homogeneous mixture of a polymer such as a poly-1-olefin or a copolymer of ethylene and an alkyl acrylate, a wax such as a paraffinic petroleum wax, and a resin such as an ester of rosin or an aliphatic hydrocarbon resin. The mixture is added to a pumpable liquid carrier fluid and injected into a well.

U.S. Pat. No. 3,882,029 describes finely divided particles comprising a mixture of a wax, an oil-soluble surface active agent, a water-dispersible surface active agent, an ethylene-vinyl acetate copolymer and a fatty alcohol. The particles are dispersed in an aqueous salt solution containing chrome lignite, hydroxyethylcellulose and xanthan gum.

U.S. Pat. No. 3,954,629 shows finely divided particles comprising a mixture of polyethylene or an ethylene-vinyl acetate copolymer, a polyamide and a softening agent such as a long chain aliphatic diamide or a polyterpene resin. The particles are suspended in a liquid carrier.

In brief, these prior art compositions contain wax which is an inherently soft particle, an agent which hardens the wax particle, for example the widely used ethylene-vinyl acetate copolymer, and one or more additives which have low solubility in oil but are utilized to improve the fluid loss control properties of the particles, for example chrome lignite. In spite of the wide variety of known well treating compositions which compositions have certain advantages, need remains for compositions which have both improved fluid loss control and cause reduced permeability damage to the hydrocarbon-producing zones of the reservoir.

Accordingly, it is a principal object of this invention to provide a well treating composition and method for use thereof which combine improved fluid loss control properties with reduced permeability damage to the reservoir.

Yet another object of the invention is to provide such a composition which contains a minimum of oil-insoluble components.

Still another object of the invention is to provide such a composition which contains solid particulate matter having a variety of particle sizes.

Other objects, advantages, and features of the invention will be apparent from the following description.

SUMMARY OF THE INVENTION

This invention involves a novel, non-damaging variable-density, low fluid loss well completion and workover fluid composition and method for use thereof in well processes wherein a subterranean reservoir or a portion thereof is contacted by the completion fluid. The composition is made up of a mixture of about 270 to 400 pounds per barrel water, about 14 to 91 pounds per barrel of a water-soluble inorganic salt weighting agent, about 1 to 8 pounds per barrel of a first relatively high softening point resin fluid loss control additive, about 8 to 60 pounds per barrel of a microemulsion fluid loss control additive, and, optionally, about 1.5 to 10 pounds per barrel of a water-dispersible thickening agent, and- /or about 1 to 20 pounds per barrel of an alkaline pH control agent. 100 parts by weight of the micro-emulsion contains about 45 to 85 parts by weight of water and about 15 to 55 parts by weight of solids made up of about 12 to 30 percent by weight of an oil-soluble surface active agent, about 20 to 38 percent of a water-dispersible surface active agent, about 8 to 30 percent of a wax, about 20 to 50 percent of a second relatively low softening point resin, and, optionally, about 0.7 to 4 percent of an additive to prevent phase separation and/or about 0.03 to 0.30 percent of a bacteriacide.

DETAILED DESCRIPTION OF THE INVENTION

Well completion and workover fluid compositions which come in contact with oil-containing subterranean reservoirs in some instances should have fluid loss control properties so as to minimize the invasion of the reservoir by the compositions during the carrying out of a well process, especially to prevent the fluid from flowing predominantly into the more permeable portions of a reservoir having heterogeneous permeability. At the same time, following completion of the well process, the injected compositions should be removed from the oil-containing portions of the reservoir as completely as possible to minimize reduction in permeability of these strata. The two attributes of fluid loss control and minimizing the reduction in reservoir permeability are difficult to achieve in a single composition since the former depends in part on the presence of solid particulate matter in the composition and the latter depends on the dissolution of the same solid particulate matter. The composition and method of this invention provide the desired combination of fluid loss control and a minimum of permeability reduction following completion of the well process in which the composition is employed.

The water-soluble inorganic salt component of the composition both prevents or inhibits hydration and swelling of the water-sensitive components of the reservoir and increases the density of the fluid composition. The fluid contains at least about 1 percent by weight dissolved salts to inhibit hydration of the water-sensitive clays contained in the reservoir. Also, the density (mud weight) can be increased by the addition of these dissolved salts, the maximum density being limited by the solubility of the salts. The concentration of salts must be maintained below the saturation concentration at the temperatures to which the fluid will be subjected to prevent salting out, i.e., solids precipitation. While the maximum mud weight is dependent upon the particular salt or salts dissolved in the fluid and the temperature, mud weight can generally be increased from the minimum of about 63 pounds per cubic foot up to about 85 pounds per cubic foot by the control of salt concentration.

Inorganic salts which can be dissolved in the fluid include alkali metal and ammonium halides and nitrates. The preferred salts include sodium, potassium, and ammonium halides, and particularly sodium chloride, potassium chloride, and ammonium chloride. Either a single salt may be dissolved in the fluid, or a mixture of salts can be employed. The preferred concentration ranges for various salts are listed in Table 1.

TABLE 1

PREFERRED CONCENTRATION RANGES FOR VARIOUS SALTS

| Salt | Concentration Range (% by Wt.) |
|---|---|
| Sodium chloride | 1 to 10 |
| Ammonium chloride | 1 to 20 |
| Potassium chloride | 1 to 22 |
| Sodium nitrate | 1 to 20 |
| Ammonium nitrate | 1 to 40 |
| Potassium nitrate | 1 to 30 |

Expressed another way, the composition contains about 14 to 91 pounds per barrel of inorganic salt. Preferably, the inorganic salt is present in a concentration of about 20 to 80 pounds per barrel.

The composition also contains about 1 to 8 pounds per barrel, preferably about 2 to 5 pounds per barrel, of a first relatively high softening point, finely divided particulate resin. Suitable resins include the following classes: copolymers from variable, incompletely characterized mixtures of unsaturated hydrocarbons derived from coal, such as the coumarone-indene resins; rosins and rosin derivatives; petroleum resins; polymers derived from one or more terpenes; and condensation products of aromatic hydrocarbons with formaldehyde. The term excludes, therefore, such other hydrocarbon polymers as polyethylene, polystyrene or polybutadiene.

Coumarone-indene resins are well known readily fusible, low-molecular-weight polymers that are produced by the catalytic and thermal polymerization of mixtures containing coumarone (benzofuran) and indene and that consist chiefly of polyindenes. Examples of commercially available coumarone-indene resins are marketed by the Neville Chemical Company under the trademark Neville "R" Resins having a softening point of about 150° C.

Rosin is a thermoplastic acidic product (resin) isolated from exudates of pine trees. Oxides, hydroxides, salts and other metal compounds react with the carboxyl group of resin acids to form soaps and resinates. Esterification of the carboxyl group of rosin with short-chain monohydric alcohol and with various polyhydric alcohols yields thermoplastic resinous esters having a wide variety of softening points and other properties. Pentalyn K, marketed by Hercules Inc., is a pentaerythritol ester of dimeric rosin acids having a softening point of 188° C. Dymerex marketed by Hercules Inc., is a polymerized rosin containing about 50 percent by weight heterogeneous dimeric rosin acids and 50 percent by weight of neutral materials and monomeric resin acids and has a softening point of 150° C.

Petroleum resins comprise a class of high aromatic synthetic polymeric products characterized by unsaturation and derived from a variable mixture of unsaturated monomers obtained as volatile by-products in the cracking of natural gas, gas oil or petroleum naphthas. These unsaturated monomers consist of mono- and diolefins such as pentenes, hexenes, heptenes, pentadienes and hexadienes; cyclic olefins and diolefins such as cyclopentene, cyclopentadiene, cyclohexene, cyclohexadienes and methylcyclopentadiene; cyclic diolefin dimers such as diocyclopentadiene and methylcyclopentadiene dimer; and vinyl aromatic hydrocarbons such as styrene, a-methylstyrene, vinyltoluones, indene and methyllidenes. An example of a commercially available petroleum resin is Picco 6140 marketed by Hercules Inc. having a softening point of 140° C. Another example is Piccodiene 2270 marketed by Pennsylvania Industrial Chemical Corporation having a softening point of 270° C.

The polyterpene resins are obtained by polymerizing unsaturated terpenes to obtain an amorphous, thermoplastic, acidic resin. One group of polyterpenes essentially comprises polymerized beta-pinene, while another group essentially comprises polymerized alpha-pinene. Such polymers have melting points from about 10° to about 135° C. The lower melting resins are unsuitable for use in this invention since they are liquids at ambient temperatures or melt under bottom-hole conditions causing too rapid dispersion of the solid composition. The higher melting point resins are preferred for use in this invention. Commercial polyterpene resins exemplary of these preferred terpene resins are TB 11 and TB 11A marketed by the Kendall Company, terpene-bicycloheptadiene resins having softening points of 143° and 146° C. respectively.

An example of a condensation product of an aromatic hydrocarbon with formaldehyde is Poly XF200 marketed by Sinclair Petrochemicals, Inc., an xylene-formaldehyde resin having a softening point of 200° C. Toluene, mesilylene, pseudocumene and durene can also be condensed with formaldehyde.

The softening point of the first resins should be about 135° C. or above. The softening point should be high enough so that the particles of the finely divided resin tend to maintain their integrity at the temperature to which the completion fluid is heated during its use rather than melting or fusing together. It is also important that the first resin be available for addition to the completion fluid in finely particulate form. Thus, the softening point should be high enough so that the first resin particles do not agglomerate, lump or stick together during storage prior to addition to the completion fluid. Typically, lumping of particles begins at temperatures considerably below the resin softening point. It is the presence of the individual particles of the first resin which is at least partially responsible for the fluid loss control properties of the completion fluid. The first resin should be ground or pulverized to a particle size comparable to or slightly smaller than the formation pore size distribution. The first resin can be ground using conventional pulverizing techniques. It is preferred that the first resin be subjected to cryogenic milling, such as with a disk mill using dry ice cooling. The first resin is preferably ground to a particle size range of about 0.5 to 100 microns (μm).

The completion fluid further contains about 8 to 60 pounds per barrel, preferably about 10 to 50 pounds per barrel, of a microemulsion containing further fluid loss control additives. 100 parts by weight of the microemulsion contains water in an amount of about 45 to 85 parts by weight, preferably 55 to 80 parts by weight and solids in an amount of about 15 to 55 parts by weight, preferably 20 to 45 parts by weight.

The solids component of the microemulsion component of the completion fluid contains the following ingredients:

| | Broad Concentration Range (% by weight) | Preferred Concentration Range (% by Weight) |
|---|---|---|
| Oil-soluble surfactant | 12 to 30 | 16 to 22 |
| Water-dispersible surfactant | 20 to 38 | 24 to 33 |
| Wax | 8 to 30 | 10 to 25 |

-continued

| | Broad Concentration Range (% by weight) | Preferred Concentration Range (% by Weight) |
|---|---|---|
| Low softening point resin | 20 to 50 | 25 to 40 |
| Agent to control phase separation (optional) | 0.7 to 4 | 1 to 3 |
| Bactericide (optional) | 0.03 to 0.3 | 0.05 to 0.2 |

The oil-soluble surface active agent employed in the microemulsion is a glyceryl or sorbitan higher fatty acid partial ester, exemplary of which are the glyceryl and sorbitan mono- and di-esters of saturated fatty acids containing between 12 and 20 carbon atoms. Specific esters that can be employed in these compositions include glyceryl monolaurate, glyceryl monomyristate, glyceryl monopalmitate, glyceryl monostearate, glyceryl 1,3-distearate, sorbitan monolaurate, sorbitan monomyristate, sorbitan monopalmitate, sorbitan monostearate, and sorbitan 1,3-distearate. Preferred oil-soluble surface active agents are glyceryl and sorbitan monostearate.

The water-dispersible surface active agent is a water-dispersible polyethylene glycol higher fatty acid ester. Exemplary polyethylene glycol higher fatty acid esters include esters of polyethylene glycols having molecular weights of about 300 to 10,000 and saturated fatty acids containing between 12 and 20 carbon atoms. Specific polyethylene glycol fatty acid esters include polyethylene glycol monolaurate, polyethylene glycol monomyristate, polyethylene glycol monopalmitate, and polyethylene glycol monostearate esters of polyethylene glycols having molecular weights of about 300 to 10,000. Preferred surface active compounds include polyethylene glycol 300 monolaurate, polyethylene glycol 900 monostearate, polyethylene glycol 1000 monostearate, polyethylene glycol 4000 monostearate, and polyoxyethylene glycol 6000 monostearate. The designations "300," "900," "1000," "4000" and "6000" indicate the approximate molecular weight of the polyethylene glycol employed to form the ester. A particularly preferred water-dispersible surface active agent is polyethylene glycol 6000 monostearate.

Any of a wide variety of waxes can be used in the microemulsion. Suitabable waxes include crystalline and microcrystalline petroleum waxes, beeswax, carnauba wax, candellia wax, montan wax, and the like. One preferred class of waxes includes the fully and partially refined paraffin waxes melting between about 52° and 77° C. Another class of waxes and wax-like substances that can be employed, particularly in higher temperature applications, are long chain aliphatic hydrocarbon and oxidized hydrocarbon waxes melting above about 77° C., such as the synthetic Fischer-Tropsch waxes. These waxes are characteristically straight or branched chain aliphatic hydrocarbons and oxygenated aliphatic hydrocarbons such as aliphatic carboxylic acids, esters and amides having molecular weights higher than the paraffin waxes, and particularly having molecular weights of about 500 to 2500. A preferred class of synthetic waxes are long chain aliphatic hydrocarbons and oxidized hydrocarbon waxes melting between about 90° and 121° C.

The waxes incorporated into the compositions of this invention are selected for their melting points and solubility in oil. The selected wax must exhibit a melting point above the maximum temperature to which it will be subjected, and preferably at least about 5° C. above this temperature. Also, the wax should be at least slowly soluble in oil so that it will not permanently damage oil-bearing strata of the formation, and if necessary, can be removed by swabbing the well with oil. The waxes useful in the particulate low fluid loss additive composition can be a blend of two or more of the aforementioned waxes.

The second relatively low softening point resin component of the microemulsion can be any of the various types of resins employed as a first relatively high softening point resin, except that the softening point should be below about 135° C., for example about 90° to 134° C.

Since the microemulsion is often admixed at a centrally located place of manufacture and transported to a point of use, it is not necessary that the second resin have a relatively high softening point to prevent agglomeration. As soon as the second resin is suspended in the micro-emulsion, agglomeration of the particles is no longer a problem. Also, it is found that a relatively low softening point resin is desirably somewhat more easily soluble in reservoir fluids than is relatively high softening point resin. Suitable second relatively low softening point resins include: coumarone-indene resins marketed by Pennsylvania Industrial Chemical Corporation under the trademark Picco N-100-1 having a softening point of 100° C., and Piccoumarone 410HL having a softening point of 110° C.; an aromatic organic rosin acid marketed by Hercules Inc. under the trademark Pexalyn 600 having a softening point of 104° C.; petroleum resins marketed by Pennsylvania Industrial Chemical Corporation under the trademark Piccopale having a softening point of 110° C. and Picco 6110 having a melting point of 110° C.; a polyterpene resin marketed by Pennsylvania Industrial Chemical Corporation under the trademark Piccolyte S-125 having a softening point of 125° C.; and a condensation product of an aromatic hydrocarbon with formaldehyde marketed by Sinclair Petrochemicals Inc. under the trademark Poly XF 100, which condensation product is an xylene-formaldehyde resin having a softening point of 100° C.

It has been found that many of the oil-soluble, water-insoluble microemulsions of this invention are incompatible in the liquid state under certain temperature conditions, i.e., the molten liquid ingredients of the composition tend to separate into separate liquid phases. This incompatibility is particularly observed as the molten compositions are cooled to the solidification temperature. Thus, a single phase homogeneous liquid may be obtained at the mixing temperature, which separates into two separate phases on cooling. Phase separation causes nonuniformity of the solid solution resulting in a poor additive material. Phase separation can be avoided and a uniform homogeneous product obtained by incorporating into the composition a small amount of an oil-soluble fatty alcohol containing 10 to 14 carbon atoms. Exemplary fatty alcohols include decyl alcohol, lauryl alcohol, and myristyl alcohol, with lauryl alcohol being particularly preferred. The concentration of fatty alcohol required to achieve homogeniety is critical, with separation of the constituents occurring both with two low and with excessive concentrations of fatty alcohol. While the critical concentration of fatty alcohol generally falls within the range of about 0.7 to 4 percent by weight, preferably 1 to 3 percent by weight, the concentration required to obtain homogeniety depends upon the specific composition of the solid solution and the fatty alcohol employed, and is generally within a range of about ±0.5 weight percent within this range. For example, the critical composition of a specific fatty alcohol required to render a given composition homogeneous may vary from about 1.5 to 2.5 weight percent. The concentration of fatty alcohol required for any specific composition can be determined experimentally.

The microemulsion also optionally contains a bactericide in the amount of about 0.03 to 0.3 percent by weight, preferably about 0.05 to 0.2 percent by weight.

The optional bactericides which can be used include formaldehyde, paraformaldehyde, ammonia, quaternary ammonium compounds, sodium hypochlorite, and phenols.

The microemulsion has a median particle size of about 4 microns ($\mu$m) distributed over a range of 1 to 32 $\mu$m as measured by Coulter counter analysis. The second resin which is added to the microemulsion has a particle size range of about 5–50 $\mu$m, preferably about 10 to 30 $\mu$m. Commercial resins can be obtained in finely divided particulate form. In some instances it may be necessary to further grind the available resins to reduce them to the desired particle size range.

The optional water-dispersible thickening agent component of the completion fluid, when used, is used in an amount of about 1.5 to 10 pounds per barrel, preferably about 2 to 8 pounds per barrel. Suitable thickening agents include a cellulose ether, bio-polymer or a natural or synthetic gum which agents are either used singly or in combination. The cellulose ethers increase the viscosity of the aqueous solutions and maintain this viscosity, i.e., are shear stable, when the solution is subject to a shearing action such as it undergoes when being pumped down a well and into a reservoir. The gums tend to increase the viscosity of aqueous solutions but undergo shear thinning, i.e., decrease in viscosity when subjected to shearing action. Depending upon the particular use to which the fluid is put, a shear stable fluid or a fluid which undergoes shear thinning may be desirable.

The preferred cellulose ether is hydroxyethylcellulose which is prepared by treating callulose with caustic and then reacting the caustic treated cellulose with about 1 to 3 moles of ethylene oxide for each anhydroglucose unit in the cellulose molecule. The viscosity of an aqueous solution of hydroxyethylcellulose depends upon the concentration and molecular weight of the hydroxyethylcellulose. Broadly, the hydroxyethycellulose employed in the practice of this invention has about 1 to 3 moles of substituent ethylene oxide per anhydroglucose unit and is characterized by a Brookfield viscosity of about 1,500 to 5,000 centipoises at 25° C. for a 1 weight percent solution thereof. A preferred hydroxyethycellulose has about 2.5 moles of substituent ethylene oxide per anhydroglucose unit and is characterized by a viscosity of about 1,500 to 2,500 centipoises at 25° C. for a 1 weight percent solution. A suitable hydroxyethylcellulose is marketed by Hercules Incorporated under the trademark Natrosol 250 HR hydroxethycellulose. Carboxymethyl cellulose can also be used.

The preferred biopolymer is xanthan gum, a high molecular weight linear polysaccharide. Exemplary of the xanthan gums that can be employed is an industrial grade of xanthan gum marketed by the Kelco Company under the trademark Kelzan XC xanthan gum.

Natural gums which can be used include plant exudates such as arabic, tragacanth, karaya and ghatti; seed or root products such as locust bean, guar and psyllium seed; seaweed extracts such as azar, algin, carrageenan and furocellarian; and others such as pectin, gelatin, starch and larch gum. Operable synthetic gums are vinyl polymers such as polyvinylpyrrolidone, polyvinyl alcohol and carboxyvinyl polymer; acrylic polymers such as polyacrylic acid and polyacrylamide; and ethylene oxide polymers.

The optional pH control agent component of the completion fluid, when used, is used in an amount of about 1 to 20 pounds per barrel, preferably 2 to 10 pounds per barrel.

The pH control agent can be an alkaline material such as a water-soluble amine or an alkali metal hydroxide, for example, potassium hydroxide. The pH control agent is used in an amount to raise the pH of the fluid to at least about 9.0. Some fluid loss control agents appear to function better in systems at a pH of at least about 9.0. Other fluid loss control agents appear to be unaffected by the pH of the system.

The microemulsion component of the composition of this invention can be prepared readily by melting in proper proportions the individual components of the oil-soluble surface active agent, the water-dispersible surface active agent, at least a portion of the second low softening point resin, and, if employed, the water-dispersible thickening agent, the additive to prevent phase separation and/or the bactericide. Alternatively these ingredients can be combined in the proper proportions and then melted and agitated to form a homogeneous mixture. The melted mixture is then stirred into hot water of approximately the same temperature as the melted mixture and the resulting composition allowed to slowly cool down while agitation continues until the solids reform to produce an oil-in water microemulsion. Broadly, 100 parts by weight of this microemulsion comprises about 45 to 85 parts by weight of water and about 15 to 55 parts by weight of solids comprising about 12 to 30 percent by weight of oil-soluble surface agent, about 20 to 38 percent by weight of water-dispersible surface active agent, about 8 to 30 percent by weight of wax, about 20 to 50 percent by weight of a second low softening point resin, about 0.7 to 4 percent by weight of an additive to prevent phase separation, if used, and about 0.03 to 0.3 percent by weight of a bactericide, if used.

The well completion and workover fluid of this invention is then prepared by mixing together in any order desired about 8 to 60 pounds per barrel of microemulsion, about 270 to 400 pounds per barrel of water, about 14 to 91 pounds per barrel of a water-insoluble inorganic salt, about 1 to 8 pounds per barrel of a first high softening point resin, about 1.5 to 10 pounds per barrel of a water-dispersible thickening agent, if used, and about 1 to 20 pounds per barrel of a pH control agent, if used. It is preferred that the microemulsion be stirred into the water followed by the first resin, the water-dispersible thickening agent, the water-insoluble inorganic salt and the pH control agent.

100 parts by weight of an especially preferred microemulsion composition comprises about 55 to 80 parts by weight of water and about 20 to 45 parts by weight of solids comprising about 16 to 22 percent by weight of sorbitan monostearate, about 24 to 33 percent by weight of polyethylene glycol sorbitan monostearate, about 10 to 25 percent by weight of a paraffin wax having a melting point of about 60° C., about 25 to 40 percent by weight of Pexalyn 600 resin marketed by Hercules, Inc., a 50 percent by weight modified polar ester resin in toluene having a softening point of 104° C., about 1 to 3 percent by weight of lauryl alcohol and about 0.05 to 0.2 percent by weight of paraformaldehyde. An especially preferred well completion and workover fluid is then prepared by mixing together about 10 to 50 pounds per barrel of the above-described micro-emulsion, about 300 to 350 pounds per barrel of water, about 20 to 80 pounds per barrel of potassium chloride, about 2 to 5 pounds per barrel of Pico 6140 resin marketed by Hercules, Inc., a low molecular weight non-polar petroleum hydrocarbon resin having a softening point of 140° to 144° C., about 1 to 4 pounds per barrel of hydroxyethylcellulose thickening agent, about 1 to 4 pounds per barrel of Kelzan XC-AL biopolymer marketed by the Kelco Company, an xantham gum thickening agent, and about 2 to 10 pounds per barrel potassium hydroxide pH control agent.

The compositions of this invention are useful in treating permeable subterranean reservoirs. In its broadest application, the process of this invention comprises contacting a subterranean reservoir penetrated by a well with the aforesaid composition injected through the well. This treatment can comprise a single temporary and selective plugging step, or it can be an integral part of a comprehensive fracturing, well drilling, acidizing or solvent treating process. Also the fluid composition of this invention can be effective used as a low fluid loss drilling fluid employed in the drilling of oil and gas wells and as a workover fluid employed in recompleting oil and gas wells. In the drilling and workover applications, the drilling fluid is circulated from the surface to a drilling zone in a reservoir during a rotary drilling operation, and at least a portion of the fluid is returned to the surface. The compositions of this invention can be used as a fracturing fluid employed in hydraulically fracturing the reservoir surrounding a well, wherein the fracturing fluid is injected through the well and into contact with the reservoir at a pressure and volume flow rate sufficient to fracture the reservoir. The composition also can be employed in chemically treating, acidizing and other well treating operations wherein it is desired to control fluid loss to permeable underground structures.

The invention is further illustrated by the following examples which are illustrative of specific modes of practicing the invention and are not intended as limiting the scope of the invention as defined by the appended claims.

EXAMPLES 1 to 4

The microemulsion component of a slowly oil-soluble, water-insoluble low fluid loss fluid well composition is prepared by first melting and combining 18.3 percent by weight sorbitan monostearate, 27.4 percent by weight polyethylene glycol monostearate, 18.3 percent by weight paraffin wax having a melting point of about 60° C., 34 percent by weight Pexalyn 600 hydrocarbon resin marketed by Hercules Inc., and having a softening point of 104° C., 1.9 percent by weight lauryl alcohol and 0.1 percent by weight paraformaldehyde. Next 28 parts by weight of the melted composition is added to 72 parts by weight water heated to about 66° C. The mixture is stirred and allowed to cool slowly to room temperature. Upon cooling, the solids reform and a microemulsion forms. The fluid well composition is prepared by mixing together 24.5 pounds per barrel of the above-described microemulsion, 327 pounds per barrel water, 21 pounds per barrel of potassium chloride, 2.5 pounds per barrel of Picco 6140 petroleum hydrocarbon resin marketed by Hercules Inc., having a softening point of 140° C. and having various particle size distributions or substitutes therefor (See Table 2), 1 pound per barrel of Natrosol 250 HR hydroxy ethyl cellulose marketed by Hercules, Inc., 1 pound per barrel of Kelzan XC-AL biopolymer marketed by the Kelco Company, an xanthan gum, and 2 pounds per barrel of potassium hydroxide. The static fluid loss and return permeability using this composition is determined as follows:

A 1-inch diameter, 1-inch long Berea sandstone core is sealed in a 1-inch diameter brass tubing jacket with the core end faces remaining unsealed. The core is placed under vacuum to remove the air therefrom, soaked in a 3 percent by weight aqueous solution of sodium chloride for 24 hours and stored under kerosine. The flow rate of kerosine through the core at 38° C. is determined. The core is placed in a static fluid loss apparatus, 150 milliters of the instant composition poured into the apparatus, the temperature of the system raised to 38° C., the fluid forced against the core by applying 500 p.s.i.g. nitrogen pressure to the system, and the fluid loss through the core determined at various time intervals up to 30 minutes. The core is then removed from the apparatus and the flow rate of kerosine through the core at 38° C. determined in the direction opposite that in which the fluid was forced against the core in the fluid loss test. The return permeability (percent) is 100 times the permeability to kerosine after the fluid loss test divided by the permeability to kerosine before the fluid loss test. The results of these tests are reported in the following Table 2:

TABLE 2

| | Fluid Loss Control Properties and Return Permeability of Various Completion Fluids | | | | |
|---|---|---|---|---|---|
| | Low Softening Point Resin Component of the Well Composition or Equivalent | | | | Return |
| | | Particle Size (%) | | Static Fluid Loss | Permeability |
| Examples | Material | 5 Microns | 5–30 microns | 30 microns | (ml. in 30 min.) | % |
| 1 | XP-20 Chrome Lignite | 3 | 17 | 80 | 48 | 44 |
| 2 | Picco 6140 Resin | 1 | 14 | 85 | 48 | 84 |
| 3 | " | 5 | 35 | 60 | 12 | 90 |
| 4 | " | 75 | 25 | — | 34 | 90 |

The results of Example 1 show that when using XP-20 chrome lignite, a known non-oil-soluble fluid loss control additive of the prior art in the well completion fluid, adequate control of fluid loss is achieved but the low return permeability indicates considerable plugging of the core by the completion fluid. The results of Examples 2 to 4 show that, when using the low softening point resin component of this invention as a fluid loss control additive in the well completion fluid, adequate control of fluid loss is achieved and the high return permeability indicates little undesirable plugging of the core by the completion fluid.

EXAMPLE 5

An offshore well in California is drilled to a depth of 2,400 feet with an aqueous clay base drilling fluid containing produced water, 3 pounds per barrel of attapulgite, and 5 to 10 pounds per barrel of bentonite, depending on the viscosity desired, and having a mud weight of 68 pounds per cubic foot. A microemulsion is prepared as described in Examples 1 to 4 at a manufacturing facility and shipped to the well site where a fluid well composition is prepared by admixing 7 pounds per barrel of the microemulsion, 2 pounds per barrel of Natrosol 250 HR., 3 pounds per barrel of Picco 6140 petroleum hydrocarbon resin having a mean particle size of 6.6 μm and the remainder produced water to which is added 21 pounds per barrel of potassium chloride. The fluid well composition has a density of 68 pounds per cubic foot. 240 barrels of fluid are required to fill the hole. A total of 600 barrels of fluid well composition is prepared and used to displace the clay base drilling fluid out of the well. The fluid well composition is circulated through the well as a drilling fluid at a rate of 9 barrels per minute while the well is underreamed from a 9⅞-inch diameter to a 15-inch diameter over the interval from 2,265 to 2,410 feet. This step removes the clay base mud cake from the sidewall of the wall. Next, 7 inch diameter casing is run into the well. A 12 foot long section of wire wrapped screen is attached to the bottom of the casing. A packer is positioned in the well annulus at the bottom of the casing. The annulus below the packer is gravel packed. The annulus above the packer is cemented. The well is placed on production. The high volume of oil produced indicates that the well completion operation was successful and the fluid well composition of this invention used as an underreaming drilling fluid did not damage the permeability of the producing interval.

While particular embodiments of the invention have been described, it will be understood, of course, that the invention is not limited thereto since many modifications can be made and it is intended to include within the invention such modifications as are within the scope of the claims.

The invention having thus been described, we claim:
1. An aqueous well drilling, completion or workover fluid comprising a mixture of:
(1) about 8 to 60 pounds per barrel of a microemulsion comprising:
  (a) about 45 to 85 parts by weight of water,
  (b) about 15 to 55 parts by weight of solids comprising
    (A) about 12 to 30 percent by weight of an oil-soluble surface active agent,
    (B) about 20 to 38 percent by weight of a water-dispersible surface active agent,
    (C) about 8 to 30 percent by weight of wax,
    (D) about 20 to 50 percent by weight of a relatively low softening point resin having a softening point of about 90° to 134° C., selected from the group consisting of rosin acids, rosin esters, coumarone-indene resins, petroleum resins, polymers derived from one or more terpenes and condensation products of aromatic hydrocarbons with formaldehyde, (2) about 270 to 400 pounds per barrel of water, (3) about 14 to 91 pounds per barrel of a water-soluble inorganic salt, and (4) about 1 to 8 pounds per barrel of a particulate relatively high softening point resin having a softening point of 135° C. or above selected from the group consisting of rosin acids, rosin esters, coumarone-indene resins, petroleum resins, polymers derived from one or more terpenes and condensation products of aromatic hydrocarbons with formaldehyde.

2. The composition defined in claim 1 wherein the particulate relatively high softening point resin is selected from the group consisting of highly aromatic petroleum resins, terpene-bicycloheptadiene resins, pentaerythritol esters of dimeric rosin acids and xylene-formaldehyde resins.

3. The composition defined in claim 2 wherein the particulate relatively high softening point resin has a particle size of about 0.5 to 100 microns.

4. The composition defined in claim 1 wherein the aqueous well drilling, completion or workover fluid also contains about 1.5 to 10 pounds per barrel of a water-dispersible thickening agent selected from the group consisting of cellulose ethers, xanthan gum, natural gums and synthetic gums.

5. The composition defined in claim 1 wherein the aqueous well drilling, completion or workover fluid also contains about 1 to 20 pounds per barrel of a pH control agent selected from the group consisting of water soluble amines and alkali metal hydroxides.

6. The composition defined in claim 1 wherein the relatively low softening point resin is selected from the group consisting of highly aromatic petroleum resins, terpene-bicycloheptadiene resins, pentaerythritol esters of dimeric rosin acids and xyleneformaldehyde resins.

7. The composition defined in claim 1 wherein the microemulsion also contains about 0.7 to 4 percent by weight of an additive to prevent phase separation comprising an oil-soluble fatty alcohol containing from 10 to 14 carbon atoms.

8. The composition defined in claim 1 wherein the microemulsion also contains about 0.03 to 0.3 percent by weight of a bactericide selected from the group consisting of formaldehyde, paraformaldehyde, ammonia, quaternary ammonium compounds, sodium hypochlorite and phenols.

9. The composition defined in claim 1 wherein the oil-soluble surface active agent is selected from the group consisting of glyceryl higher fatty acid partial esters and sorbitan higher fatty acid partial esters.

10. The composition defined in claim 1 wherein the water-dispersible surface active agent is a polyethylene glycol higher fatty acid ester.

11. The composition defined in claim 1 wherein the wax is selected from the group consisting of crystalline wax, microcrystalline petroleum wax, beeswax, carnauba wax, candellia wax and montan wax.

12. The composition defined in claim 1 wherein the water-soluble insoluble salt is selected from the group consisting of alkali metal and ammonium halides and alkali metal and ammonium nitrates.

13. An aqueous well drilling completion or workover fluid comprising a mixture of:

(1) 10 to 50 pounds per barrel of a microemulsion comprising;
(a) 55 to 80 parts by weight water,
(b) 20 to 45 parts by weight of solids comprising
(A) 16 to 22 percent by weight of an oil-soluble surface active agent selected from the group consisting of glyceryl monostearate and sorbitan monostearate,
(B) 24 to 33 percent by weight of polyethylene glycol monostearate water-dispersible surface active agent,
(C) 10 to 25 percent by weight of a wax selected from the group consisting of full and partially refined paraffin waxes melting between about 52° and 77° C., and long chain aliphatic hydrocarbon and oxidized hydrocarbon waxes melting between about 90° and 121° C.
(D) 25 to 40 percent by weight of an aromatic organic rosin acid having a softening point between 90° and 134° C., (2) about 300 to 350 pounds per barrel of water, (3) about 20 to 80 pounds per barrel alkali metal chloride, and (4) about 2 to 5 pounds per barrel of a particulate petroleum resin having a softening point of 135° C. or above.

14. The composition defined in claim 13 wherein the alkali metal chloride is potassium chloride.

15. In the method for drilling, completion of workover of a well penetrating a subterranean reservoir wherein a drilling, completion of workover fluid is passed through the well into contact with the subterranean reservoir as part of the drilling, completion or workover method, the improvement which comprises employing as the drilling, completion or workover fluid a reservoir fluid-soluble or reservoir fluid-dispersible solids-containing fluid composition comprising an admixture of:

(a) 8 to 60 pounds per barrel of a microemulsion prepared by mixing together while first heating to melt all ingredients and next cooling to room temperature;
(1) about 45 to 85 parts by weight water,
(2) about 15 to 55 parts by weight of solids comprising
(A) about 12 to 30 percent by weight of an oil-soluble surface active agent,
(B) about 20 to 38 percent by weight of a water-dispersible surface active agent,
(C) about 8 to 30 percent by weight of wax, and
(D) about 20 to 50 percent by weight of a relatively low softening point resin having a softening point of about 90° to 134° C. selected from the group consisting of rosin acids, rosin esters, coumarone-indene resins, petroleum resins, polymers derived from one or more terpenes and condensation products of aromatic hydrocarbons with formaldehyde, (b) 200 to 400 pounds per barrel of water, (c) 14 to 91 pounds per barrel of a water-soluble inorganic salt, and (d) 1 to 8 pounds per barrel of a particulate relatively high softening point resin having a softening point of 135° C. or above selected from the group consisting of rosin acids, rosin esters, coumarone-indene resins, petroleum resins, polymers derived from one or more terpenes and condensation products of aromatic hydrocarbons with formaldehyde.

16. The method defined in claim 15 wherein the particulate relatively high softening point resin is selected from the group consisting of highly aromatic petroleum resins, terpene-bicycloheptadiene resins, pentaerythritol esters of dimeric rosin acids and xylene-formaldehyde resins.

17. The method defined in claim 16 wherein the particulate relatively high softening point resin has a particle size of about 0.5 to 100 microns.

18. The method defined in claim 15 wherein the drilling, completion or workover fluid also contains about 1.5 to 10 pounds per barrel of a water-dispersible thickening agent selected from the group consisting of cellulose ethers, xanthan gum, natural gums and synthetic gums.

19. The method defined in claim 15 wherein the drilling, completion or workover fluid also contains about 1 to 20 pounds per barrel of a pH control agent selected from the group consisting of water soluble amines and alkali metal hydroxides.

20. The method defined in claim 15 wherein the relatively low softening point resin is selected from the group consisting of highly aromatic petroleum resins, terpene-bicycloheptodiene resins, pentaerythritol esters of dimeric rosin acids and xylene-formaldehyde resins.

21. The method defined in claim 15 wherein the microemulsion also contains about 0.7 to 4 percent by weight of an additive to prevent phase separation comprising an oil-soluble fatty alcohol containing from 10 to 14 carbon atoms.

22. The method defined in claim 15 wherein the microemulsion also contains about 0.03 to 0.3 percent by weight of a bactericide selected from the group consisting of formaldehyde, paraformaldehyde, ammonia, quaternary ammonium compounds, sodium hypochlorite and phenols.

23. The method defined in claim 15 wherein the oil-soluble surface active agent is selected from the group consisting of glyceryl higher fatty acid partial esters and sorbitan higher fatty acid partial esters.

24. The method defined in claim 15 wherein the water-dispersible surface active agent is a polyethylene glycol higher fatty acid ester.

25. The method defined in claim 15 wherein the wax is selected from the group consisting of crystalline wax, microcrystalline petroleum wax, beeswax, carnauba wax, candellia wax and montan wax.

26. The method defined in claim 15 wherein the water-soluble insoluble salt is selected from the group consisting of alkali metal and ammonium halides and alkali metal and ammonium nitrates.

27. In the method for drilling, completion or workover of a well penetrating a subterranean reservoir wherein a drilling, completion or workover fluid is passed through the well into contact with the subterranean reservoir as part of the drilling, completion or workover method, the improvement which comprises employing as the drilling, completion or workover fluid a reservoir fluid-soluble or reservoir fluid-dispersible solids-containing fluid composition comprising an admixture of:
  (1) 10 to 50 pounds per barrel of a microemulsion comprising:
    (a) about 55 to 80 parts by weight water,
    (b) about 20 to 45 parts by weight of solids comprising
      (A) about 16 to 22 percent by weight of an oil-soluble surface active agent selected from the group consisting of glyceryl monostearate and sorbitan monostearate,
      (B) about 24 to 33 percent by weight of polyethylene glycol monostearate water-dispersible surface active agent.
      (C) 10 to 25 percent by weight of a wax selected from the group consisting of full and partially refined paraffin waxes melting between about 52° and 77° C., and long chain aliphatic hydrocarbon and oxidized hydrocarbon waxes melting between about 90° and 121° C.,
      (D) 25 to 40 percent by weight of an an aromatic organic rosin acid having a softening point between 90° and 134° C.,
  (2) about 300 to 350 pounds per barrel of water,
  (3) about 20 to 80 pounds per barrel alkali metal chloride, and
  (4) about 2 to 5 pounds per barrel of a particulate petroleum resin having a softening point of 135° C. or above.

28. The method defined in claim 27 wherein the alkali metal chloride is potassium chloride.

* * * * *